(12) United States Patent
Tang et al.

(10) Patent No.: US 8,611,449 B2
(45) Date of Patent: Dec. 17, 2013

(54) METHOD AND APPARATUS FOR DEMODULATION OF A REFERENCE SIGNAL

(75) Inventors: Yang Tang, San Diego, CA (US); Qiang Wu, Beijing (CN); Chi Gao, Beijing (CN); Yongxing Zhou, Beijing (CN)

(73) Assignee: FutureWei Technologes, Inc., Plano, TX (US)

( * ) Notice: Subject to any disclaimer, the term of this patent is extended or adjusted under 35 U.S.C. 154(b) by 183 days.

(21) Appl. No.: 13/286,988

(22) Filed: Nov. 1, 2011

(65) Prior Publication Data

US 2012/0121031 A1   May 17, 2012

Related U.S. Application Data

(60) Provisional application No. 61/414,294, filed on Nov. 16, 2010, provisional application No. 61/413,740, filed on Nov. 15, 2010.

(51) Int. Cl.
*H04L 1/02* (2006.01)
*H04B 7/02* (2006.01)

(52) U.S. Cl.
USPC ......................................................... 375/267

(58) Field of Classification Search
USPC ............ 375/267, 295, 299; 455/301; 370/334
See application file for complete search history.

(56) References Cited

U.S. PATENT DOCUMENTS

| | | | |
|---|---|---|---|
| 8,038,968 B2 | 10/2011 | Sorensen et al. | |
| 8,428,018 B2 * | 4/2013 | Noh et al. | 370/329 |
| 8,467,469 B2 * | 6/2013 | Lee et al. | 375/267 |
| 2009/0179797 A1 | 7/2009 | Kwon et al. | |
| 2009/0209264 A1 | 8/2009 | Yang et al. | |
| 2009/0252091 A1 | 10/2009 | Tang et al. | |
| 2009/0257423 A1 | 10/2009 | Kwon et al. | |
| 2010/0002797 A1 | 1/2010 | Sanayei | |
| 2010/0085925 A1 | 4/2010 | Kishiyama et al. | |
| 2010/0202548 A1 | 8/2010 | Sanayei | |

(Continued)

FOREIGN PATENT DOCUMENTS

| | | |
|---|---|---|
| CN | 101645722 A | 2/2010 |
| CN | 101647304 A | 2/2010 |

(Continued)

OTHER PUBLICATIONS

PCT International Search Report and Written Opinion received in PCT Application No. PCT/CN2011/082026, mailed Feb. 23, 2012, 11 pages.

*Primary Examiner* — Ted Wang
(74) *Attorney, Agent, or Firm* — Slater & Matsil, L.L.P.

(57) ABSTRACT

A method for wireless network communication is provided. The method comprises determining, by a transmitter including a quantity of antennas, a quantity of transmitted layers; mapping a quantity of data symbols to the antennas using a quantity of precoders; generating a quantity of demodulation reference signal (DMRS) antenna ports based on the quantities of the antennas, the transmitted layers, and the precoders; and determining whether to precode at least one of the DMRS antenna ports with the precoders. The method further maps the precoded data symbols and the DMRS antenna ports to a quantity of resource elements. The method then modulates a signal comprising the resource elements and transmits the modulated signal to a receiver. Subsequently, the method estimates a channel received by the receiver over the DMRS antenna ports.

21 Claims, 7 Drawing Sheets

(56) References Cited

U.S. PATENT DOCUMENTS

2010/0232525 A1    9/2010    Xia et al.
2010/0246494 A1    9/2010    Sanayei
2010/0265841 A1    10/2010    Rong et al.

FOREIGN PATENT DOCUMENTS

CN    101800622 A    8/2010
WO    WO 2010/032953 A2    3/2010
WO    WO 2011/082574 A1    7/2011

* cited by examiner

METHOD AND APPARATUS FOR DEMODULATION OF A REFERENCE SIGNAL

This application claims the benefit of U.S. Provisional Application Ser. No. 61/414,294, filed on Nov. 16, 2010, entitled "Method and Apparatus for Demodulation of a Reference Signal," and U.S. Provisional Application Ser. No. 61/413,740, filed on Nov. 15, 2010, entitled "Method and Apparatus for Demodulation of a Reference Signal," which applications are hereby incorporated herein by reference.

TECHNICAL FIELD

The present invention in general relates to communications systems and methods, and in particular embodiments, to a method and apparatus for demodulation of reference signals and for channel estimation using reference signals.

BACKGROUND

Various multiple access schemes may be used in wireless communication systems, such as code division multiple access (CDMA), time division multiple access (TDMA), frequency division multiple access (FDMA), orthogonal frequency division multiple access (OFDMA), etc. These modulation schemes can increase system capacity by demodulating signals received from multiple users of a communication system.

FDMA is a channel access method used in multiple-access protocols as a channelization protocol. FDMA gives users an individual allocation of one or several frequency bands, or channels. Multiple access systems coordinate access between multiple users. These protocols are utilized differently, at different levels of the theoretical Open Systems Interconnection (OSI) model.

Single-carrier frequency division multiple access (SC-FDMA) is a frequency-division multiple access scheme. Like other multiple access schemes (TDMA, FDMA, CDMA, OFDM), it assigns of multiple users to a shared communication resource. SC-FDMA is used in some popular wireless system standards such as Long Term Evolution Advanced (LTE-A) for uplink communications. SC-FDMA can be viewed as a linearly precoded OFDMA scheme, in the sense that it has an additional Discrete Fourier Transform (DFT) processing preceding the conventional OFDM processing. Just like in OFDM, guard intervals with cyclic repetition are introduced between blocks of symbols to efficiently eliminate time spreading (caused by multi-path propagation) among the blocks.

In SC-FDMA, multiple access among users is made possible by assigning to different users different sets of non-overlapping Fourier-coefficients (sub-carriers). This is achieved at the transmitter by inserting (prior to Inverse Fast Fourier Transform (IFFT)) silent Fourier-coefficients (at positions assigned to other users), and removing them on the receiver side after the Fast Fourier Transform (FFT).

SUMMARY OF THE INVENTION

Technical advantages are generally achieved, by embodiments of a system and method for demodulation of reference signals and for channel estimation using reference signals.

The embodiments can be implemented in wireless communications systems using relays, such as a LTE, a LTE-A compliant wireless communications system, or an IEEE802.16m system.

In accordance with an example embodiment, a method for wireless network communication is provided. The method comprises determining, by a transmitter including a quantity of antennas, a quantity of transmitted layers, which is less than or equal to the quantity of antennas and determined based on a notification information, a traffic pattern, or an available transmission power; mapping a quantity of data symbols to the antennas using a quantity of precoders, where the quantity of precoders may be determined by a predefined formula or otherwise, and the precoders may be generated based on a codebook and assigned to precode the data symbols in a periodic way or in a random way; generating a quantity of demodulation reference signal (DMRS) antenna ports based on the quantities of the antennas, the transmitted layers, and the precoders; and determining whether to precode at least one DMRS antenna port with a precoder.

In accordance with an example embodiment, the method further comprises mapping the quantity of precoded data symbols and the quantity of DMRS antenna ports to a quantity of resource elements. In some of the embodiments, the quantity of data symbols is within one slot, while in some other embodiments, the quantity of data symbols is within two slots. In some of the embodiments, the quantity of data symbols is configured by a normal cyclic prefix (CP), while in some other embodiments, the quantity of data symbols is configured by an extended CP.

In accordance with an example embodiment, the quantity of DMRS antenna ports is equal to a product of the quantity of transmitted layers and the quantity of precoders if the product is less than the quantity of antennas; and the quantity of DMRS antenna ports is equal to the quantity of antennas if the product is more than or equal to the quantity of antennas.

In accordance with an example embodiment, the quantity of DMRS antenna ports is precoded if a product of the quantity of transmitted layers and the quantity of precoders is less than or equal to the quantity of antennas; and avoiding precoding any of DMRS antenna ports if the product is more than the quantity of antennas.

In accordance with an example embodiment, the method further comprises modulating a signal comprising the quantity of resource elements and transmitting the modulated signal to a receiver. Furthermore, the transmitter and the receiver may be part of a multiple input multiple output (MIMO) communication system and the modulated signal is modulated by a single-carrier frequency division multiple access (SC-FDMA) scheme and transmitted to the receiver via a physical uplink shared channel (PUSCH) channel.

In accordance with an example embodiment, the method further comprises estimating a channel received by the receiver over the quantity of DMRS antenna ports.

In accordance with an example embodiment, a communication device may comprise a quantity of antennas, a layer mapper unit to map a plurality of data streams to a quantity of transmitted layers; a precoder selection unit to determine a quantity of precoders to be applied over a quantity of data symbols; and a demodulation reference signal (DMRS) controller to control a DMRS generator to generate a quantity of DMRS antenna ports, and to control a DMRS precoding unit to determine whether to precode at least one DMRS antenna port based on the quantity of antennas, the quantity of transmitted layers, and the quantity of precoders.

In accordance with an example embodiment, a communication device may further comprise a precoding unit to precode the quantity of data symbols with the quantity of precoders; and a resource element mapper unit to map the quantity of precoded data symbols and the quantity of DMRS antenna ports to a quantity of resource elements.

In accordance with an example embodiment, a communication device may further comprise a modulation unit to modulate a signal comprising the quantity of resource elements and transmit the modulated signal to a receiver via the quantity of antennas.

In accordance with an example embodiment, a method for wireless network communication is provided. The method comprises determining, by a transmitter with a first number of antennas, a second number of transmitted layers which is less than or equal to the first number of antennas and determined based on a notification information, a traffic pattern, or an available transmission power; determining a third number of precoders applied over a fourth number of data symbols by a predefined formula or otherwise; further determining a set of a fifth number of demodulation reference signal (DMRS) antenna ports; and determining whether to precode at least one DMRS antenna port based on the first number of antennas, the second number of transmitted layers, the third number of precoders, the fourth number of data symbols, and the fifth number of DMRS antenna ports.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
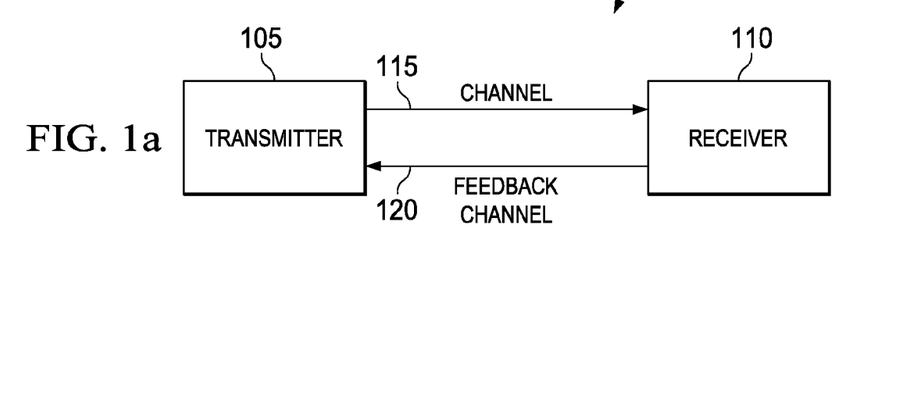
FIGS. 1(a) and 1(b) illustrate configurations of a general communication system comprising a transmitter and a receiver, and a MIMO system.

Wireless communication systems are widely used to provide voice and data services for multiple users using a variety of access terminals such as cellular telephones, laptop computers and various multimedia devices. Such communications systems can encompass local area networks, cellular telephone, mobile broadband networks, and the like. FIG. 1(a) illustrates a portion of a general wireless communications system 100 that can utilize embodiments of the present invention. Wireless communications system 100 includes a transmitter 105 and a receiver 110. Transmissions from the transmitter 105 to the receiver 110 occur over a channel 115. The receiver 110 estimates the channel 115 and provides information regarding the channel 115 to the transmitter 105. The receiver 110 may utilize a feedback channel 120 to transmit the information regarding the channel 115 to the transmitter 105.

Mobile broadband networks can conform to a number of system types or partnerships such as General Packet Radio Service (GPRS), Worldwide Interoperability for Microwave Access (WiMAX), Universal Mobile Telecommunications System (UMTS), the 3rd Generation Partnership Project (3GPP), 1X Evolution-Data Optimized EV-DO, or Long Term Evolution (LTE). The LTE radio access technology is based on 3GPP Release 8 (Rel-8). The 3GPP Release 10 (Rel-10) standard, also known as Long Term Evolution Advanced (LTE-A), further extends the performance and capabilities of LTE radio access technology. LTE and LTE-A encompass the evolution of the radio access network through the Evolved Universal Terrestrial Radio Access Network (E-UTRAN).

In the E-UTRAN system, an enhanced Node B (eNodeB or eNB), which can also be called a base station, an access point, a base transceiver station system (BTS), etc., communicates with one or more user equipments (UE), or mobile stations, terminals, users, user terminals (UT), subscriber stations (SS), wireless devices, and so forth. A downlink (DL) generally denotes a communication link from an eNB to a UE, and an uplink (UL) generally denotes a communication link from a UE to an eNB. In the DL, the transmitter may be a part of the eNB, and the receiver may be a part of the UE. In the UL, the transmitter may be a part of the UE, and the receiver may be a part of the eNB.

Multiple input multiple output (MIMO) communication systems offer large increases in throughput due to their ability to support multiple parallel data streams that are each transmitted from different antennas. MIMO requires that the user has multiple transmit antennas and receive antennas. In single user MIMO (SU-MIMO), a user is served by one base station, and the user occupies a transmission resource, such as a time or frequency resource, exclusively. In multiuser MIMO system, more than one user equipment transmit in the same time-frequency resources. In LTE, MIMO technologies have been widely used to improve downlink peak rate, cell coverage, as well as average cell throughput. LTE supports up to four transmit antennas on downlink. LTE-A supports antenna configurations of 8*8 for downlink transmission and 4*4 for uplink transmission. Here N*M denotes a configuration of N transmit antennas and M receive antennas or antenna ports. More specifically, it represents the configuration of N eNB transmit antennas and M UE receive antennas for downlink, and the configuration of N UE transmit antennas and M eNB receive antennas for uplink.

Figure 1B:
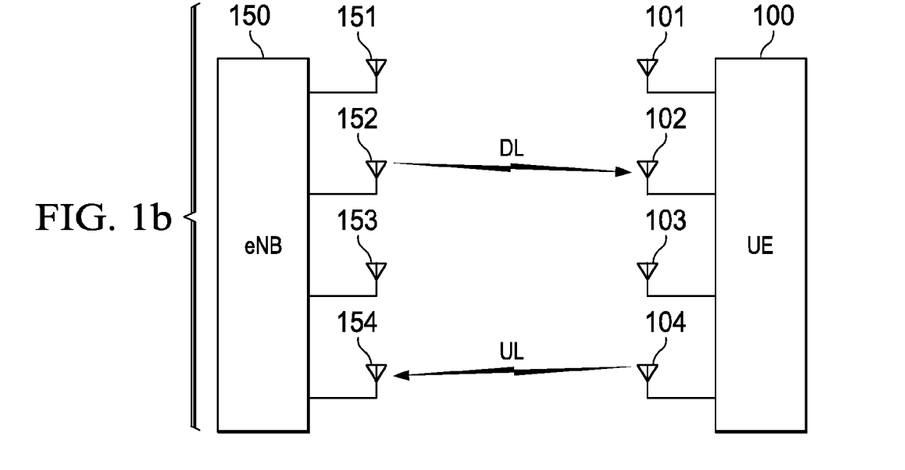

FIG. 1(b) illustrates a SU-MIMO system comprising an eNB 150 and a UE unit UE 100. The eNB 150 is generally a fixed station (but may be mobile), while the UE may be fixed or mobile. The link DL from the eNB 150 to UE 100 is a downlink, while the link UL from UE 100 to the eNB 150 is an uplink. The UE 100 conveys one or more feedback signals to the eNB 150 to support SU-MIMO on the DL. The feedback signals are often termed the UE reporting parameters. There are 4 antennas (151 to 154) on the eNB 150 and 4 antennas (101-104) on the UE. The number of antennas is shown only for illustration purposes. There may be other number of antennas for the eNB 150 and the UE 100. The eNB 150 and the UE 100 may have different number of antennas.

The eNB transmits DL data to the UE on a physical downlink shared channel (PDSCH). The UE transmits uplink data to the eNB on a physical uplink shared channel (PUSCH), and UE reporting parameters to support DL transmissions via a physical uplink control channel (PUCCH). Note that such UE reporting parameters can also be transmitted via PUSCH.

DL transmission and UL transmission may use different multiple access schemes. For example, DL transmission may use OFDMA, and UL transmission may use SC-FDMA. A typical SC-FDMA scheme implies that DFT-spread symbol streams are allocated (or mapped) to consecutive subcarriers or equally-spaced subcarriers.

Sounding reference signals (SRS) and demodulation reference signals (DMRS) may be provided in the UL to be used by the eNB to measure the uplink channel, select appropriate layer mapping and perform UL data demodulation. In the open-loop operation mode, although there is no pre-coding matrix indicator (PMI) feedback, the eNB estimates the channel from received signals such as SRS and DMRS, and may utilize a different transmission format. On the other hand, demodulation based on non-precoded DMRS allows a receiver to estimate the non-precoded channel over N antennas.

It would improve efficiency if the channel information can be estimated by other ways without using the fixed overhead. In the traditional approach, the number of DMRS signals is the same as the number of transmission layers because each layer comprises one DMRS antenna port. In various embodiments of the invention, different numbers of DMRS antenna ports are transmitted in a transmission layer UL and channel estimation can be performed by the eNB on UL only using the DMRS antenna ports.

Figure 2A:
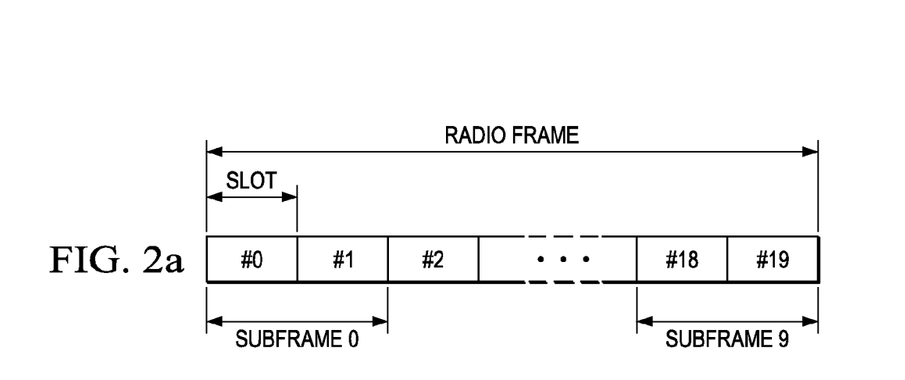
FIGS. 2(a)-2(b) illustrate configurations of communication radio frame structures.
Figure 2B:
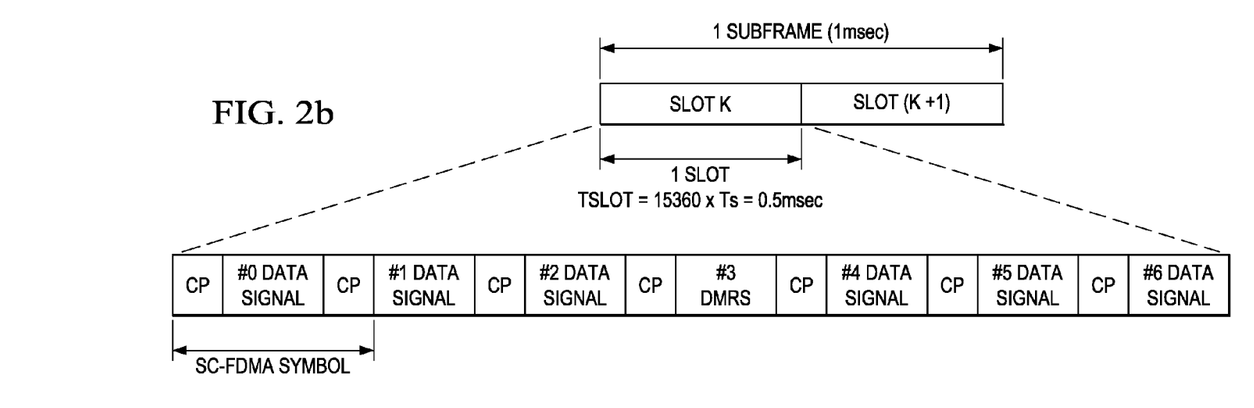

FIGS. 2(a) and 2(b) show an example of an LTE compliant radio frame, which comprises subframes, slots, and symbols. A radio frame has a time length of 10 milliseconds (ms) and includes 10 subframes numbered from 0 to 9. One subframe is 1 ms, and may include two slots. Each slot has a length of 0.5 ms. One slot may include a plurality of SC-FDMA symbols (or OFDM symbols) in a time domain and at least one subcarrier in a frequency domain. The slot may be a unit of allocated radio resources in the time domain and the frequency domain. Other units can be used to allocate radio resources, such as two slots or a subframe.

The number of SC-FDMA symbols included in one slot may vary according to the configuration of a cyclic prefix (CP). The CP is classified into a normal CP and an extended CP. For example, if the SC-FDMA symbols are configured by the normal CP, the number of SC-FDMA symbols included in one slot may be 7, as shown in FIG. 2(b). The number of SC-FDMA symbols included in one slot may be 6 if configured by the extended CP. In a case where a channel condition is unstable, for example, when a UE moves in a fast speed, the extended CP can be used to decrease inter-symbol interference.

The structure of the radio frame is for exemplary purposes only, and thus the number of subframes included in the radio frame, the number of slots included in the subframe, and the number of SC-FDMA symbols included in the slot may also change variously.

Uplink SC-FDMA traffic data may be transmitted over a PUSCH. As shown in FIG. 2(b), the $0^{th}$, $1^{st}$, $2^{nd}$, $4^{th}$, $5^{th}$, and $6^{th}$ SC-FDMA symbols among a total of 7 SC-FDMA symbols are transmitted in a slot. Traffic data is encoded, modulated and transmitted by the $0^{th}$, $1^{st}$, $2^{nd}$, $4^{th}$, $5^{th}$ and $6^{th}$ SC-FDMA symbols, and a DMRS signal is transmitted by the $3^{rd}$ SC-FDMA symbol. The DMRS symbol in the $3^{rd}$ position is used for channel estimation and Signal-to-Noise Ratio (SNR) estimation in a receiver, and it may be used to demodulate/decode the data in a signal transmitted over the PUSCH.

A reference signal such as DMRS signal comprising DMRS symbols is constructed using a reference signal sequence. The reference signal sequence may be known to both transmitter and receiver prior to a transmission.

Figure 3A:
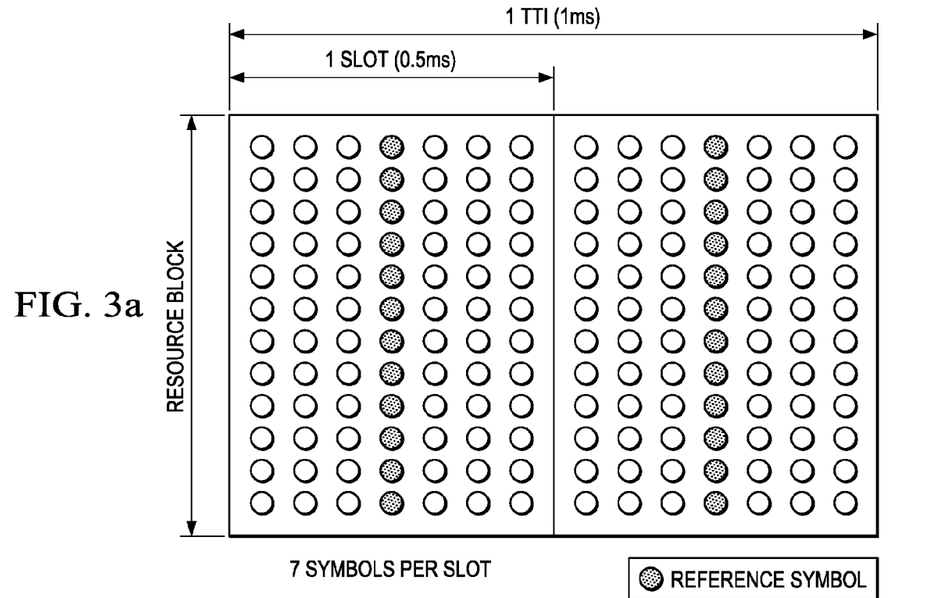
FIGS. 3(a)-3(b) illustrate configurations of resource blocks.

To transmit data and DMRS signals over the UL, data symbols and DMRS symbols are mapped to resource elements such as shown illustratively in FIG. 3(a) for a subframe includes two slots, where a unit consisting of one SC-FDMA symbol and one subcarrier is referred to as a resource element. A resource block (RB) consists of 12 subcarriers during one slot. Resource blocks may be assigned to users in pairs. Two consecutive resource blocks form one scheduling block. Since the SC-FDMA symbol is configured with the normal CP, one slot includes 7 SC-FDMA symbols in a time domain. Therefore, one subframe includes 14 SC-FDMA symbols in total. When one RB includes 12 subcarriers, one RB includes 12*7 resource elements. One or more SC-FDMA symbols in each slot may be allocated for transmission of de-modulation reference signal (DMRS) symbols. The remaining SC-FDMA symbols are allocated for data transmission to transmit data symbols, and thus 12 SC-FDMA symbols in total are allocated for data transmission within one subframe, since there are 6 symbols for data in each slot and a subframe comprises two slots, as illustratively shown in FIG. 3(a).

Figure 3B:
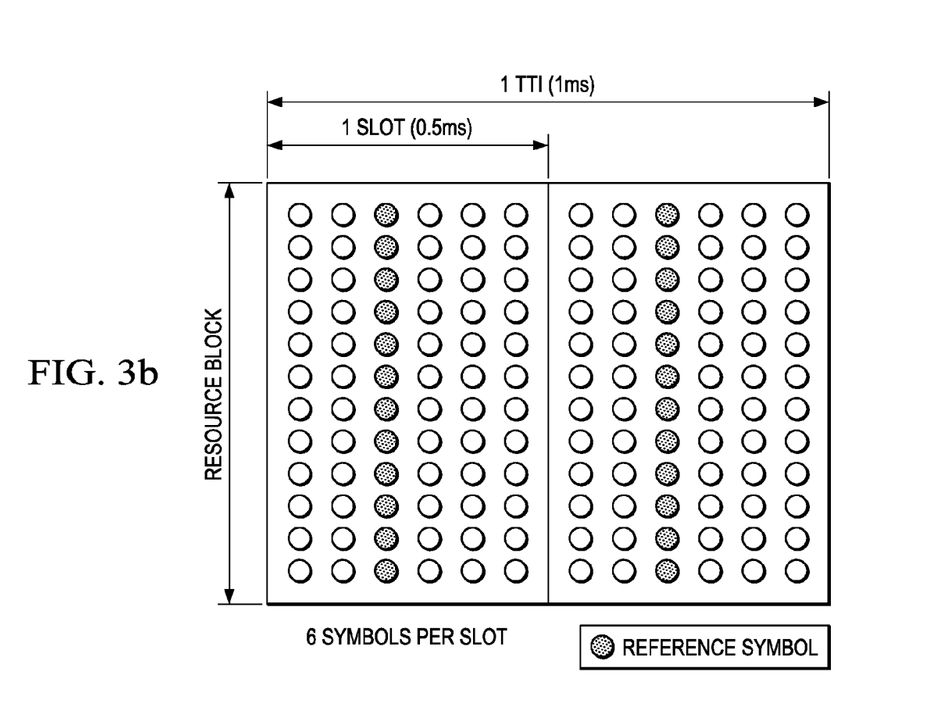

FIG. 3(b) shows another example of resource blocks within a subframe. Herein, an SC-FDMA symbol is configured with an extended CP, thus one slot includes 6 SC-FDMA symbols in a time domain. Therefore, one subframe includes 12 SC-FDMA symbols in total. In each slot, one SC-FDMA symbol is allocated for transmission of a DMRS symbol. The remaining SC-FDMA symbols are allocated for data transmission, and thus 10 SC-FDMA symbols in total are allocated for data transmission within one subframe.

The structure of the subframe is for exemplary purposes only. Thus, the number of slots included in the subframe, the number of SC-FDMA symbols included in the slot, and a position of the SC-FDMA symbol on which the DMRS is transmitted may change variously.

Figure 4:
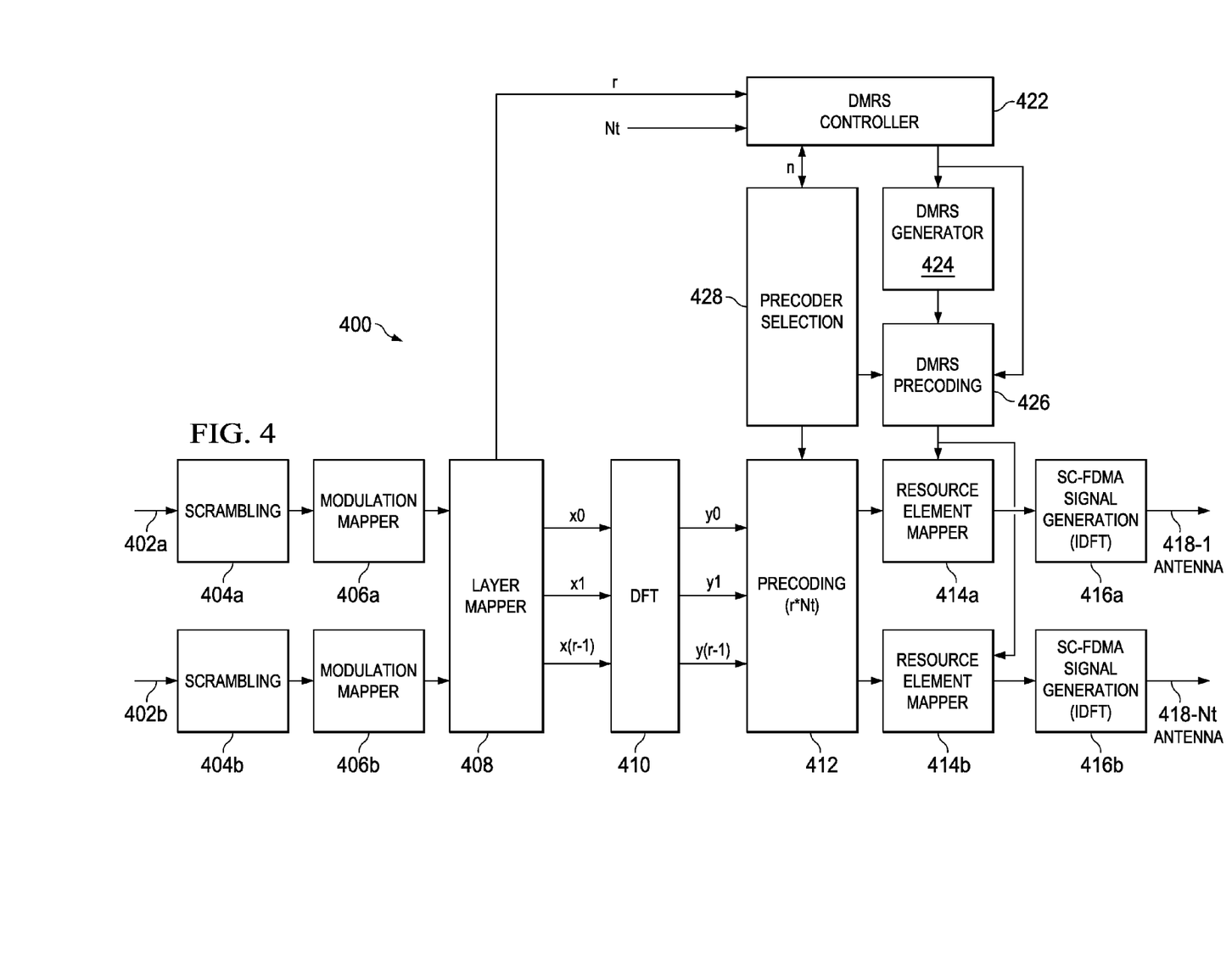
FIG. 4 illustrates an architecture for a transmitter.

FIG. 4 is a block diagram of an illustrative transmitter, which may be used in the wireless system shown in FIG. 1(b) for transmission of a MIMO signal uplink from a UE to an eNB. Within the transmitter 400, a stream of code words 402a, 402b are provided to the scrambling units 404a, 404b. In this embodiment, there are two streams of code words illustrated which are indicated by 402a and 402b, etc. Other embodiments may have different number of codewords.

The scrambling units 404a, 404b scramble the coded bits in each of the code words to be transmitted on the physical channel. The scrambled bits are then provided to the modulation mapper units 406a, 406b which map the scrambled bits to modulation constellations to generate complex-valued modulation symbols. For example, the PUSCH may use one of the following modulation schemes: QPSK (quaternary phase shift keying), 16 QAM (quaternary amplitude modulation), or 64 QAM.

The modulated symbols are then provided to the layer mapper unit 408 for mapping of the complex-valued modulation symbols onto one of several transmission layers. The number of layers r (rank r) may be less than or equal to the number of antennas or antenna ports Nt used for transmission of the physical channel, shown as 418-1 to 418-Nt. The transmitter may decide the rank r based on notification information such as rank indicator (RI), as well as other factors such as traffic pattern, available transmission power, etc. The rank r may be decided by the eNB.

The resulting complex-valued modulation symbols are passed to the DFT unit 410 to perform DFT transformation on the symbols.

Afterwards, the DFT transformed symbols are precoded by the precoding unit 412 which is controlled by the precoder selection unit 428. Pre-coding is a generic framework for mapping symbols to antennas. In 3GPP LTE/LTE-A, different codebooks have been defined depending on the number of transmit antennas. Non-codebook based precoding may be used too. Codebook based precoding may be wideband precoding or frequency selective precoding. The former scheme applies the same precoding vector on the whole frequency bank while the latter may select a different precoder on each resource block or resource element. In some embodiments, data symbols of a resource block (RB) can be coded by a different precoding matrix, which is determined by the precoder selection unit 428. In some other embodiments, data symbols of a scheduling block can be coded by a different precoding matrix, wherein a scheduling block comprises two RBs of two slots of a subframe.

The precoder selection unit 428 determines the number of precoding matrices n. In some embodiments, the number n can be related to the rank for data transmission. In some other embodiments, the number n can be determined by predefined formulas at the eNB and UE. The precoder selection unit 428 may further assign a different precoding matrix to different symbols in different ways. For example, it could be assigned in a periodical way, or in a random way.

Figure 5A:
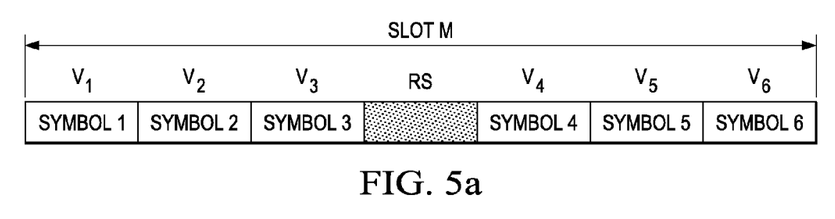
FIGS. 5(a)-5(e) illustrate details of the precoding assignment on data symbols.
Figure 5B:
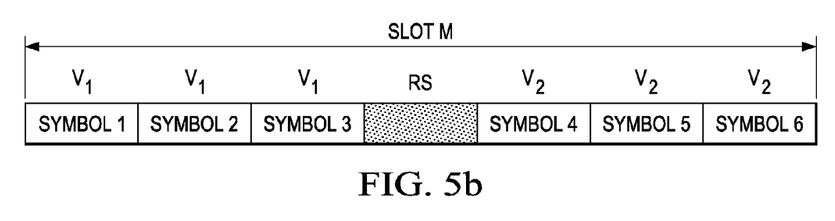
Figure 5C:
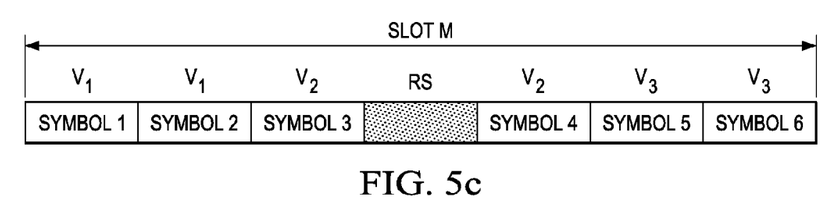
Figure 5D:
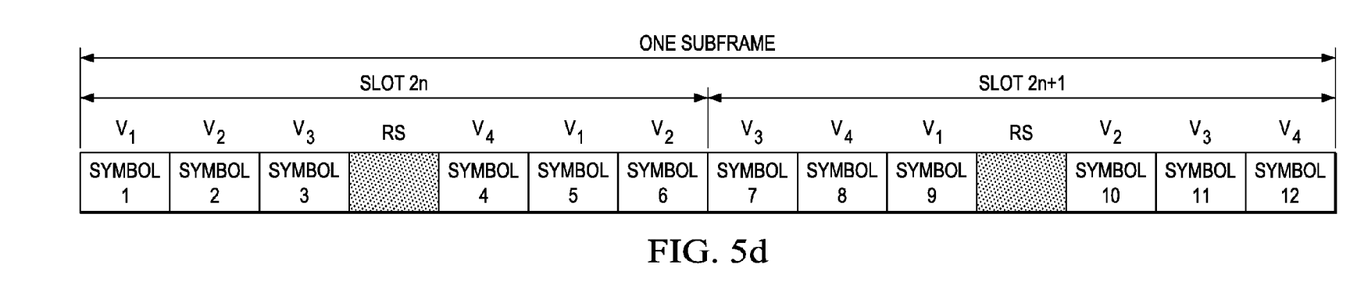
Figure 5E:
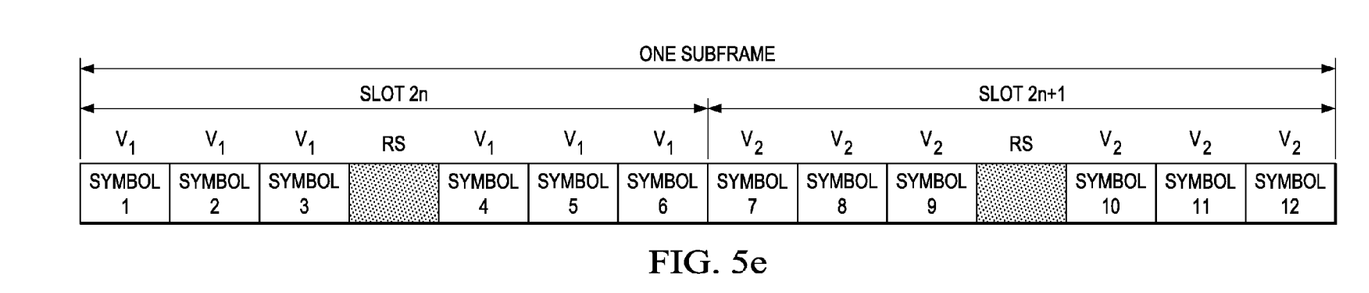

Examples of precoding are illustrated in FIGS. 5(a)-5(e). FIGS. 5(a)-5(c) show a slot comprising 7 SC-FDMA symbols of one subcarrier configured by the normal CP, with 6 data symbols and one DMRS symbol. The illustration of a slot comprising of 7 SC-FDMA symbols configured by the normal CP is only for illustrative purposes. Other embodiments may have a slot comprising 6 symbols configured by the extended CP, or other numbers of symbols by other protocols. FIGS. 5(d)-5(e) show two slots each comprising 7 SC-FDMA symbols configured by the normal CP.

In FIG. 5(a), and n=6, six different precoding matrices V1 to V6 are used for 6 different data symbols of a slot, where matrix V1 is used for precoding symbol 1, matrix V2 for symbol 2, matrix V3 for symbol 3, matrix V4 for symbol 4, matrix V5 for symbol 5, matrix V6 for symbol 6. In FIG. 5(b), n=2, and two precoding matrices V1 and V2 are used for precoding 6 data symbols of a slot, where V1 is used for symbols 1, 2, 3 and V2 is for symbols 4, 5, 6. In FIG. 5(c), n=3, and three precoding matrices V1, V2, and V3 are used for precoding 6 data symbols of a slot, where matrix V1 is used for symbol 1 and 2, V2 for symbols 3 and 4, and V3 for symbols 5 and 6.

In some embodiments, the precoder selection unit 428 may control the precoding mapping on a scheduling block of two slots. FIGS. 5(d) and 5(e) show two slots each comprising 7 SC-FDMA symbols configured by the normal CP. In FIG. 5(d), n=4, and four precoding matrices V1 to V4 are used for precoding data symbols 1 to 6 of a first slot, where V1 is used for symbols 1 and 5, V2 for symbols 2 and 6, V3 for symbol 3, and V4 for symbol 4. The same precoding matrices V1 to V4 can further be used for precoding symbols of the next slot of the same subframe. In FIG. 5(d), the four precoding matrices V1 to V4 are used for precoding data symbols 1 to 6 of the next slot, where V1 is used for symbol 9, V2 for symbol 10, V3 for symbols 7 and 11, and V4 for symbols 8 and 12. In FIG. 5(e), n=2, and a precoding matrix V1 is used for precoding symbols 1 to 6 of a slot, while V2 is used for symbols 1 to 6 of a second slot.

In FIG. 4, the DMRS controller unit 422 may determine the number of DMRS antenna ports or DMRS antenna ports to be generated and whether to precode at least one DMRS antenna port or not. Illustratively, the unit 422 may determine the number of DMRS antenna ports based on the following formula: the number of DMRS antenna ports=r*n if r*n<=Nt, and the number of DMRS antenna ports=Nt if r*n>Nt, where n represents the number of precoding matrices determined by unit 428, r represents the rank of data transmission used in the layer mapper unit 408, and Nt is the number of antennas in the transmitter. Other formulas may be used to derive the number of DMRS antenna ports as well.

The DMRS controller unit 422 may further decide whether to precode at least one of the generated DMRS antenna ports based on a derived condition. Illustratively, the DMRS symbols are precoded if Nt≥r*n, otherwise the DMRS antenna ports are not precoded, where n represents the number of precoding matrices determined by unit 428, r represents the rank of data transmission used in the layer mapper unit 408, and Nt is the number of antennas in the transmitter. Other formulas may be used to decide whether to precode DMRS antenna ports as well.

Examples of how to determine the DMRS antenna ports number and whether to precode the DMRS signals are illustrated in FIGS. 5(a)-5(e). An illustrative transmitter has 4 antennas (Nt=4). In FIG. 5(a), n=6 as demonstrated previously. Therefore the number of DMRS antenna ports is always 4 and there is no precoding for any of the DMRS antenna ports for r=1/2/3/4, where r*n=6*r>Nt=4.

FIG. 5(b) shows another example where n=2, and Nt=4. When r=1 data transmission layer is used, the number of DMRS antenna ports is r*n=1*2=2<Nt=4. Therefore two DMRS antenna ports will be generated and both will be precoded. When r=2 data transmission layer is used, the number of DMRS antenna ports is r*n=2*2=4=Nt=4. Therefore four DMRS antenna ports will be generated and all four will be precoded. When r=3 data transmission layer is used, the number of DMRS antenna ports is 4. None of the DMRS antenna ports is precoded because r*n=3*2>Nt=4. When r=4 data transmission layer is used, the number of DMRS antenna ports is 4. The DMRS symbols is not precoded because r*n=4*2>Nt=4.

FIG. 5(c) shows a third example where n=3, and Nt=4. When r=1, the number of DMRS antenna ports is r*n=1*3=3<Nt=4. Therefore all three DMRS antenna ports will be precoded. When r=2 data transmission layer is used, the number of DMRS antenna ports is 4. The DMRS antenna ports are not precoded because r*n=2*3>Nt=4. When r=3 data transmission layer is used, the number of DMRS antenna ports is 4. The DMRS antenna ports are not precoded because r*n=3*3>Nt=4. When r=4 data transmission layer is used, the number of DMRS antenna ports is 4. The DMRS antenna ports are not precoded because r*n=4*3>Nt=4.

In some embodiments, the precoder selection unit 428 may control the precoding mapping on a scheduling block of two slots. In FIGS. 5(d) and 5(e), two slots each comprising 7 SC-FDMA symbols configured by the normal CP. In FIG. 5(d), n=4, Nt=4, and four precoding matrices V1 to V4 are used for precoding symbols 1 to 6 of a slot. When r=2, because of n=4, r*n=2*4>4=Nt, therefore the number of DMRS antenna ports is 4 and the DMRS antenna ports are not precoded. In FIG. 5(e), n=2, Nt=4, and when r=1, r*n=2*1<4, 2 DMRS antenna ports with precoding are needed.

In FIG. 4, after the DMRS controller unit 422 determines the number of DMRS antenna ports to be generated and whether the DMRS antenna ports are to be precoded or not, and the control information is passed to the DMRS generator unit 424 and the DMRS precoding unit 426. The DRMS generator unit 424 generates the determined number of DMRS antenna ports. If precoding of DMRS antenna ports is needed, the DMRS precoding unit 426 will precode the DMRS symbols from unit 424. If no precoding is needed, the DMRS antenna ports from unit 424 will pass through the unit 426 without precoding.

Next, the precoded data symbols from unit 412 and the DMRS antenna ports from unit 426 are mapped to resource elements in resource element mapper units 414a, 414b. The resource elements may belong to a resource block. The resource elements may belong to a scheduling block of two slots. The resource elements may be configured by the normal CP or the extended CP.

The resource mapped symbols are then provided to SC-FDMA signal generation unit 416a, 416b for the generation of complex-value time-domain SC-FDMA signals where IDFT is also performed. Afterwards, the SC-FDMA signals are transmitted via antennas 418-1 to 418-Nt.

Figure 6:
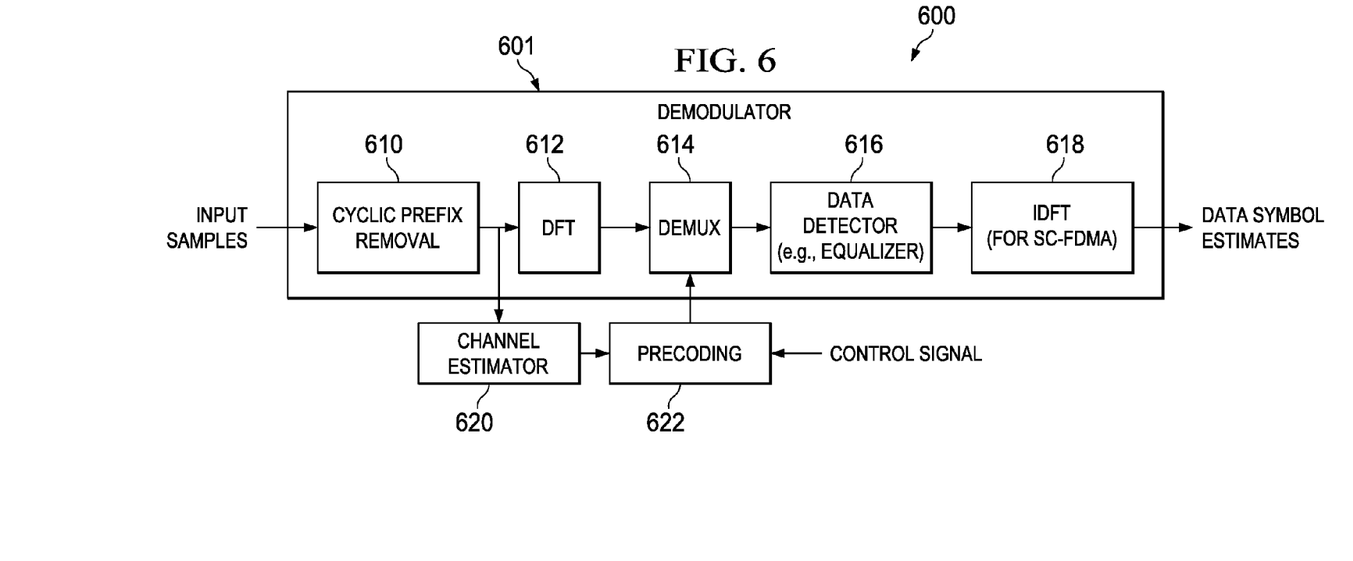
FIG. 6 illustrates an architecture for a receiver.

FIG. 6 is an embodiment of demodulator 601 and channel estimator/processor 620 at the receiver in FIG. 1(b) for receiving a MIMO signal uplink from a UE to an eNB. Within the demodulator 601, a cyclic prefix removal unit 610 receives input samples for transmission symbols received by the receiver 600 and removes the cyclic prefix in each received transmission symbol which was added to the SC-FDMA signal and output SC-FDMA signal without a CP to channel estimator unit 620 and a DFT unit 612. The DFT unit 612 performs a DFT or an FFT on the input samples for each received transmission symbol and provides frequency-domain received values, which will be provided to a demultiplexer (Demux) unit 614. The channel estimator unit 620 estimates the channel over DMRS signals, and then either applies a known precoder to the estimated channel before demodulation, or directly uses the estimated channel for demodulation of the received precoded data, based on the value of a control signal.

The Demux unit 614 provides received data values from data subbands to a data detector unit 616. Data detector unit 616 may perform frequency-domain equalization on the received data values with the channel estimate and provide detected data values. Data detector unit 616 may also perform time-domain equalization or some other type of data detection. If the transmission symbols are sent with SC-FDMA, then an IDFT unit 618 performs an IDFT or an IFFT on the detected data values for each symbol period and provides data symbol estimates.

Examples of channel estimation by the channel estimator unit 620 may be illustrated for FIGS. 5(a)-5(c). An illustrative transmitter has 4 antenna (Nt=4). In FIG. 5(a), n=6, the number of DMRS antenna ports is always 4, which is equal to the number of antennas Nt, and there is no precoding for DMRS for r=1/2/3/4. Because the DMRS antenna ports are not precoded, the eNB can first estimate the channel of subcarrier j, which is represented by H. Then according to V1-V6, the eNB calculates the effective channel H*V1 to H*V6. Generally, in all following cases, if DMRS antenna port number is the same as the antennas Nt and DMRS antenna ports are not precoded, the channel estimator unit 620 can perform channel estimation as illustrated in the instant case.

FIG. 5(b) shows another example where n=2, and Nt=4. When r=1 data transmission is used, the number of DMRS antenna ports is r*n=1*2=2. One DMRS antenna port is for estimating the channel of H*V1, and the other for H*V2. When r=2 data transmission is used, the number of DMRS antenna port is r*n=2*2=4. Two DMRS signals are for estimating the channel of H*V1, and the other two for H*V2, one per layer. When r=3 data transmission is used, the number of DMRS antenna ports is 4. The DMRS symbols are not precoded because r*n=3*2>Nt=4. When r=4 data transmission is used, the number of DMRS antenna ports is 4. The DMRS symbols is not precoded because r*n=4*2>Nt=4, therefore channel estimation can be performed similarly as in FIG. 5(a).

FIG. 5(c) shows a third example where n=3, and Nt=4. When r=1, the number of DMRS antenna ports is r*n=1*3=3. The first DMRS antenna port is for estimating the channel of H*V1, the second for H*V2 and the third for H*V3. When r=2 data transmission is used, the number of DMRS antenna ports is 4. The DMRS symbols are not precoded because r*n=2*3>Nt=4. When r=3 data transmission is used, the number of DMRS antenna port is 4. The DMRS symbols are not precoded because r*n=3*3>Nt=4. When r=4 data transmission is used, the number of DMRS antenna ports is 4. The DMRS antenna ports are not precoded because r*n=4*3>Nt=4. For DMRS symbols are not precoded cases, channel estimation can be performed similarly as shown in FIG. 5(a).

Figure 7:
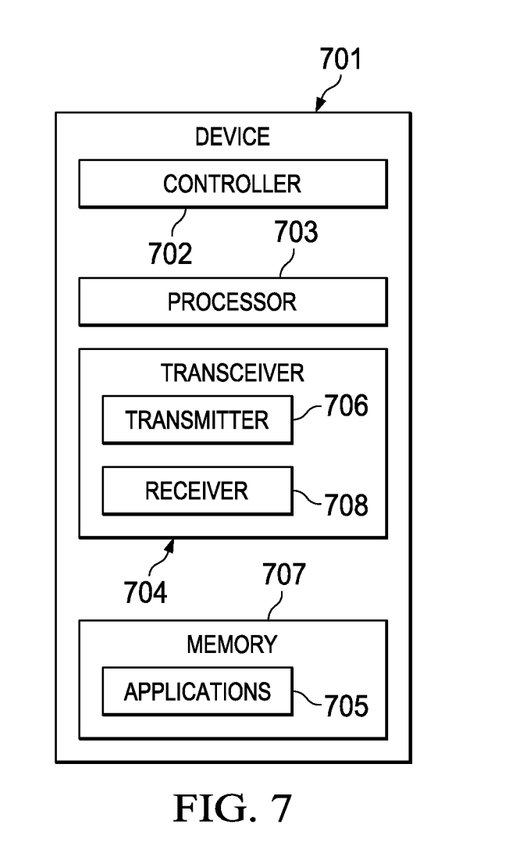
FIG. 7 illustrates an implementation of a communication device comprising a transmitter and a receiver.

FIG. 7 is a block diagram illustrating an implementation of a communication device, which comprises a transmitter and a receiver. The communication device may be the eNB or the UE shown in FIG. 1(b), where the transmitter and the receiver may perform functions as shown in FIG. 4 and FIG. 6, respectively. The Device 701 comprises a processor 703 coupled to a memory 707, a controller 702, and a transceiver 704. The memory 707 stores (software) applications 705 for execution by the processor 703. The applications 705 could be any known or future application useful for individuals or organizations. As an example, such applications 705 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 705, at least some of the applications 705 may direct the device 701 to transmit signals periodically or continuously via the transceiver 704.

Transceiver 704 comprises a transmitter 706 and a receiver 708 which may be implemented by execution of instructions that control the operation of the transceiver, which may perform the operations illustrated in FIG. 4 and FIG. 6, respectively. Some of these instructions may be stored in memory 707 and executed when needed. Some other instructions may be implemented directly by the controller 702 in hardware. As would be understood by one of skill in the art, there may be various combinations to implement the operations performed by the transmitter 706 and the receiver 708 by way of the processor 703, the controller 702, the memory 707, and the applications 705.

Although the present embodiments and their advantages have been described in detail, it should be understood that various changes, substitutions and alterations can be made herein without departing from the spirit and scope of the embodiments as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless network communication, the method comprising:
   determining, by a transmitter including a quantity of antennas, a quantity of transmitted layers;
   mapping a quantity of data symbols to the antennas using a quantity of precoders;
   generating a quantity of demodulation reference signal (DMRS) antenna ports based on the quantities of the antennas, the transmitted layers, and the precoders; and
   determining whether to precode at least one DMRS antenna port based on the generated quantity of DMRS antenna ports, and the quantities of the antennas, the transmitted layers and the precoders.

2. The method of claim 1, further comprising: mapping the quantities of precoded data symbols and DMRS antenna ports to a quantity of resource elements.

3. The method of claim 2, further comprising modulating a signal comprising the quantity of resource elements and transmitting the modulated signal to a receiver.

4. The method of claim 3, further comprising:
   estimating a channel received by the receiver over the quantity of DMRS antenna ports.

5. The method of claim 3, wherein the transmitter and the receiver are part of a multiple input multiple output (MIMO) communication system and the modulated signal is modulated by a single-carrier frequency division multiple access (SC-FDMA) scheme.

6. The method of claim 3, wherein the modulated signal is transmitted to the receiver via a physical uplink shared channel (PUSCH).

7. The method of claim 1, wherein the quantity of precoders is generated based on a codebook.

8. The method of claim 1, wherein the quantity of transmitted layers is determined based on a notification information, a traffic pattern, or an available transmission power.

9. The method of claim 1, wherein the quantity of transmitted layers is less than or equal to the quantity of antennas.

10. The method of claim 3, wherein the quantity of precoders is determined by a predefined formula at the transmitter and the receiver.

11. The method of claim 1, wherein the quantity of precoders is assigned to precode the quantity of data symbols in a periodic way.

12. The method of claim 1, wherein the quantity of data symbols is within one slot, or two slots.

13. The method of claim 1, wherein the quantity of data symbols is configured by a normal cyclic prefix (CP).

14. The method of claim 1, wherein the quantity of data symbols is configured by an extended CP.

15. The method of claim 1, wherein the quantity of DMRS antenna ports is equal to a product of the quantity of transmitted layer and the quantity of precoders if the product is less than the quantity of antennas; and the quantity of DMRS antenna ports is equal to the quantity of antennas if the product is more than or equal to the quantity of antennas.

16. The method of claim 1, further comprising a step of: precoding all of the DMRS antenna ports if a product of the quantity of transmitted layers and the quantity of precoders is less than or equal to the quantity of antennas.

17. The method of claim 1, wherein the step of determining whether to precode at least one DMRS antenna port includes: avoiding precoding any of the DMRS antenna ports if a product of the quantity of transmitted layers and the quantity of precoders is more than the quantity of antennas.

18. A communication device comprising:
   a quantity of antennas,
   a layer mapper unit to map a plurality of data streams to a quantity of transmitted layers;
   a precoder selection unit to determine a quantity of precoders to be applied over a quantity of data symbols; and
   a demodulation reference signal (DMRS) controller to control a DMRS generator to generate a quantity of DMRS antenna ports, and to control a DMRS precoding unit to determine whether to precode at least one DMRS antenna port based on the quantities of the antennas, the transmitted layers, and the precoders.

19. The communication device of claim 18, further comprising:
   a precoding unit to precode the quantity of data symbols with the quantity number of precoders; and
   a resource element mapper unit to map the quantity of precoded data symbols and the quantity of DMRS antenna ports to a quantity of resource elements.

20. The communication device of claim 18, further comprising a modulation unit to modulate a signal comprising the quantity of resource elements and transmit the modulated signal to a receiver via the quantity of antennas.

21. A method for wireless network communication, the method comprising:
   determining, by a transmitter including a first number of antennas, a second number of transmitted layers;
   mapping a third number of precoders over a fourth number of data symbols;
   generating a fifth number of demodulation reference signal (DMRS) antenna ports based on the first number of antennas, the second number of transmitted layers, the third number of precoders, and the fourth number of data symbols; and
   determining whether to precode at least one DMRS antenna port based on the first number of antennas, the second number of transmitted layers, the third number of precoders, the fourth number of data symbols, and the fifth number of DMRS antenna ports.

* * * * *